June 2, 1925.
M. UNGER
1,540,669
FURNACE REFRACTORY
Filed May 16. 1923
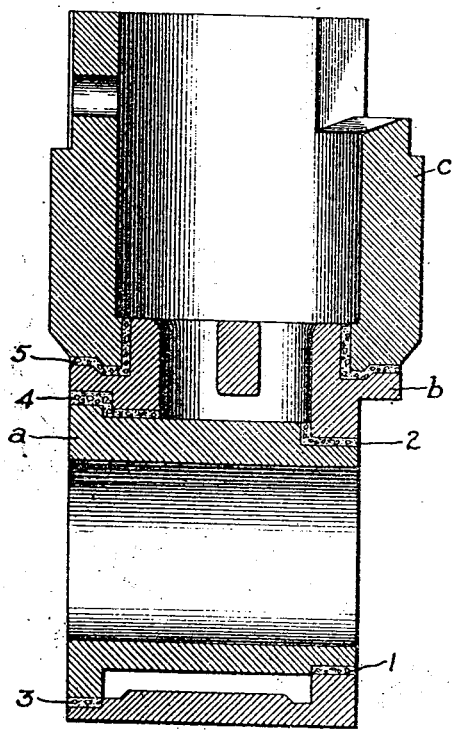
Inventor:
Magnus Unger;
by [signature]
His Attorney Patented June 2, 1925.

1,540,669

UNITED STATES PATENT OFFICE.

MAGNUS UNGER, OF PITTSFIELD, MASSACHUSETTS, ASSIGNOR TO GENERAL ELECTRIC COMPANY, A CORPORATION OF NEW YORK.

FURNACE REFRACTORY.

Application filed May 16, 1923. Serial No. 639,397.

*To all whom it may concern:*

Be it known that I, MAGNUS UNGER, a citizen of the United States, residing at Pittsfield, in the county of Berkshire, State of Massachusetts, have invented certain new and useful Improvements in Furnace Refractories, of which the following is a specification.

This application is a continuation in part of my prior application, Serial No. 554,577, filed April 18, 1922.

The present invention relates to the joining of ceramic articles, as for example, the parts of a furnace lining and it comprises particularly a method of making joints between preformed members which will be capable of withstanding the severe conditions incidental to the operation of a furnace.

When furnace parts consisting of fire clay, or other refractory material, are cemented to each other by ordinary cement, for example, fire clay, cracks develop through which leakage of fused material may occur during operation of the furnace.

In accordance with my invention the parts of the furnace structure are cemented by filling the intervening spaces with a plastic cement and introducing therein particles of ceramic material of materially greater size than the fine cement particles and preferably being introduced dry to absorb excess moisture from the cement. The large sized particles form a structure through which cracks will not extend.

The accompanying drawing is a vertical section of a furnace structure embodying my invention.

My invention is particularly applicable to the fabrication of containers or crucibles for induction furnaces from preformed parts of fire brick or other suitable refractory material, although my invention is not limited to the construction of this type of furnace.

In carrying out my invention a quantity of cement, such as fire clay rendered plastic by water, is introduced between the parts *a*, *b* and *c* to be cemented in such quantity as to partially fill the intervening space. Dry particles consisting preferably of fired fire brick are introduced and tamped into the cement. The size of these particles depends on the conditions but in general may be said to be of a size passing through a $\frac{1}{16}$ to $\frac{1}{8}$ inch mesh screen. As much of these particles should be added as will be taken up by the cement. When the particles are incorporated in the cement, more cement is introduced, followed by another quantity of fire brick particles and so on until the joint or crevice is filled, as indicated at 1, 2, 3, 4 and 5. After thoroughly drying the mixture, heat is gradually applied until the operating temperature of the furnace is attained.

As a consequence a refractory body of substantially unitary structure is produced which is substantially free from cracks and fissures which might permit the escape of molten charge.

What I claim as new and desire to secure by Letters Patent of the United States, is:

1. The method of joining together preformed parts of refractory material which consists in introducing a refractory cement between the parts to be joined and incorporating substantially dry particles of refractory material therein.

2. The method of joining together fired, shaped articles of clay to form a furnace structure which consists in introducing plastic clay between the surfaces to be joined, then introducing particles of fired clay into said cement, drying and gradually heating to the firing temperature of said clay to form a solid, unitary structure.

3. A furnace structure comprising a plurality of preformed refractory members, and a layer of refractory cement uniting said members containing imbedded therein particles of refractory material which are of materially larger size than the particles constituting said cement.

4. An induction furnace crucible comprising a plurality of preformed refractory members and layers of a refractory setting cement uniting said members containing imbedded particles of non-setting refractory material.

5. An induction furnace crucible comprising a plurality of preformed members of fire brick and layers of plastic clay uniting said members, said clay having imbedded therein particles of fired clay about $\frac{1}{16}$ to $\frac{1}{8}$ inch in diameter, said crucible being convertible by firing to a unitary structure which is substantially free from fissures.

In witness whereof, I have hereunto set my hand this 14th day of May, 1923.

MAGNUS UNGER.